(12) United States Patent
Matsuo

(10) Patent No.: US 8,814,506 B2
(45) Date of Patent: Aug. 26, 2014

(54) VARIABLE CAPACITY TURBINE

(75) Inventor: Atsushi Matsuo, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 785 days.

(21) Appl. No.: 12/996,540

(22) PCT Filed: Oct. 13, 2009

(86) PCT No.: PCT/JP2009/067710
§ 371 (c)(1),
(2), (4) Date: Dec. 6, 2010

(87) PCT Pub. No.: WO2010/047246
PCT Pub. Date: Apr. 29, 2010

(65) Prior Publication Data
US 2011/0085891 A1   Apr. 14, 2011

(30) Foreign Application Priority Data
Oct. 24, 2008   (JP) .................................. 2008-274750

(51) Int. Cl.
*F01D 17/14*   (2006.01)
(52) U.S. Cl.
USPC .......................................... 415/145; 415/184
(58) Field of Classification Search
USPC .................. 415/145, 151, 167, 183, 184, 205
See application file for complete search history.

(56) References Cited

U.S. PATENT DOCUMENTS

| 4,389,845 A | * | 6/1983 | Koike ........................... 415/205 |
| 4,729,715 A | * | 3/1988 | Wilde ........................... 415/205 |
| 6,073,447 A | * | 6/2000 | Kawakami et al. ............. 60/602 |
| 2005/0247058 A1 | | 11/2005 | Pedersen et al. |

FOREIGN PATENT DOCUMENTS

| CN | 1445440 A | 10/2003 |
| CN | 1918737 A | 2/2007 |
| DE | 31 05 179 A1 | 9/1982 |
| GB | 2 062 116 A | 5/1981 |
| JP | 56-44421 A | 4/1981 |
| JP | 60-6836 U | 1/1985 |
| JP | 62-13730 A | 1/1987 |
| JP | 64-12007 A | 1/1989 |
| JP | 5-4488 A | 2/1993 |

(Continued)

OTHER PUBLICATIONS

Japanese Office Action mailed Mar. 6, 2012 with English translation.

(Continued)

*Primary Examiner* — Richard Edgar
(74) *Attorney, Agent, or Firm* — Birch, Stewart, Kolasch & Birch, LLP

(57) ABSTRACT

There is provided a variable capacity turbine that is capable of suppressing separation from an outer peripheral face of an involute dividing wall at an inlet portion of an outer scroll, enhancing performance, and increasing a flow rate. The variable capacity turbine includes: a turbine housing having an involuted scroll formed therein; a turbine wheel rotatably provided on an inner periphery side of the scroll; the involute dividing wall mounted on the turbine housing to divide the scroll into an inner scroll and the outer scroll; and a flow regulating valve for opening and closing an introducing port formed at an inlet end of the outer scroll. The inlet portion of the outer scroll is formed to have a continuous and gentle throttle flow path from an upstream side to a downstream side.

2 Claims, 3 Drawing Sheets

(56) References Cited

FOREIGN PATENT DOCUMENTS

| | | | |
|---|---|---|---|
| JP | 7-279680 | A | 10/1995 |
| JP | 10-141003 | A | 5/1998 |
| JP | 11-6439 | A | 1/1999 |
| JP | 10-8977 | A | 10/1999 |
| JP | 11-280483 | A | 10/1999 |
| JP | 11-303642 | A | 11/1999 |
| JP | 200-110572 | A | 4/2000 |
| JP | 2002-317641 | A | 10/2002 |
| JP | 2005-330973 | A | 12/2005 |
| JP | 2006-527322 | A | 11/2006 |
| JP | 2008-208787 | A | 9/2008 |

OTHER PUBLICATIONS

Japanese Office Action for Japanese Patent Application No. 2008-274750 mailed Aug. 14, 2012, with English Translation.

Office Action for related Japanese Patent Application No. 2008-274750 issued Jul. 30, 2013 with English translation.

* cited by examiner

VARIABLE CAPACITY TURBINE

TECHNICAL FIELD

The present invention relates to a variable capacity turbine having a function of changing a flow characteristic.

BACKGROUND ART

There are known techniques as disclosed in Patent Literatures 1 and 2, for example, as a variable capacity turbine suitable for use as a turbine of a turbocharger which mainly includes the turbine and a compressor and in which exhaust gas (fluid) from an engine (internal combustion engine) rotates the turbine to thereby rotate the compressor to send atmosphere as high-pressure air into the engine.

CITATION LIST

Patent Literature

{PTL 1} Japanese Unexamined Patent Application, Publication No. Hei10-8977
{PTL 2} Japanese Unexamined Patent Application, Publication No. 2000-110572

SUMMARY OF INVENTION

Technical Problem

However, in the variable capacity turbines disclosed in Patent Literatures 1 and 2, a flow path sectional area at an inlet portion of an outer scroll increases on a way from an upstream side to a downstream side, which reduces a flow velocity of the exhaust gas, causes separation from an outer peripheral face of an involute dividing wall for separating the outer scroll and the inner scroll from each other, and reduces performance and a flow rate.

The present invention has been made with the above circumstances in view and it is an object of the present invention to provide a variable capacity turbine in which separation from an outer peripheral face of an involute dividing wall at an inlet portion of an outer scroll can be suppressed, performance can be enhanced, and a flow rate can be increased.

Solution to Problem

To achieve the above object, the present invention employs the following means.

A variable capacity turbine according to a first aspect of the present invention includes: a turbine housing having an involuted scroll formed therein; a turbine wheel rotatably provided on an inner periphery side of the scroll; an involute dividing wall mounted on the turbine housing to divide the scroll into an inner scroll and an outer scroll; and a flow regulating valve for opening and closing an introducing port formed at an inlet end of the outer scroll. An inlet portion of the outer scroll is formed to have a continuous and gentle throttle flow path from an upstream side to a downstream side.

According to the variable capacity turbine of the first aspect of the present invention, the flow path at the inlet portion of the outer scroll is the continuous throttle flow path from the upstream side to the downstream side. In other words, the inner peripheral face of the outer scroll at the inlet portion of the outer scroll and/or the outer peripheral face of the involute dividing wall are/is formed so that a flow path sectional area gradually reduces, which facilitates acceleration of the exhaust gas at the inlet portion of the outer scroll, suppresses separation from the outer peripheral face of the upstream tip end portion of the involute dividing wall, enhances performance, and increases a flow rate thereof.

In the variable capacity turbine according to the first aspect of the present invention, preferably, an inner peripheral surface of the flow control valve is a flat face and the flow control valve is formed so that the flat face and a central axis of an inlet flange forming an inlet portion of the turbine housing become substantially parallel with each other when the valve is fully open.

According to this variable capacity turbine, the flow control valve is formed so that an angle formed by the flat face positioned on the inner periphery side of the flow control valve and the central axis of the inlet flange is substantially parallel with each other, which reduces a turning angle of a fluid passing through the introducing port to thereby further suppress separation from the outer peripheral face of the upstream tip end portion of the involute dividing wall, further enhance performance, and further increase the flow rate.

In the variable capacity turbine according to the first aspect of the present invention, preferably, the flow regulating valve is formed to move parallel between positions at times when the flow rate is high and low so that the turning angle of the fluid passing through the introducing port is maintained constant at any of times when the flow rate is low, the flow rate is high, the flow rate shifts from a low rate to a high rate, and the flow rate shifts from the high rate to the low rate.

According to this variable capacity turbine, the turning angle of the fluid passing through the introducing port is maintained constant at any of times when the flow rate is low, the flow rate is high, the flow rate shifts from the low rate to the high rate, and the flow rate shifts from the high rate to the low rate, which further suppresses separation from the outer peripheral face of the upstream tip end portion of the involute dividing wall, further enhances performance, and further increases the flow rate.

A variable capacity turbine according to a second aspect of the present invention includes: a turbine housing having an involuted scroll formed therein; a turbine wheel rotatably provided on an inner periphery side of the scroll; an involute dividing wall mounted on the turbine housing to divide the scroll into an inner scroll and an outer scroll; and a flow regulating valve for opening and closing an introducing port formed at an inlet end of the outer scroll. An inner peripheral surface of the flow control valve is a flat face and the flow control valve is formed so that the flat face and a central axis of an inlet flange forming an inlet portion of the turbine housing become substantially parallel with each other when the valve is fully open.

According to the variable capacity turbine of the second aspect of the present invention, the flow control valve is formed so that an angle formed by the flat face positioned on the inner periphery side of the flow control valve and the central axis of the inlet flange is substantially parallel when the valve is fully open, which reduces a turning angle of a fluid passing through the introducing port to thereby further suppress separation from the outer peripheral face of the upstream tip end portion of the involute dividing wall, further enhance performance, and further increase the flow rate.

A variable capacity turbine according to a third aspect of the present invention includes: a turbine housing having an involuted scroll formed therein; a turbine wheel rotatably provided on an inner periphery side of the scroll; an involute dividing wall mounted on the turbine housing to divide the scroll into an inner scroll and an outer scroll; and a flow regulating valve for opening and closing an introducing port formed at an inlet end of the outer scroll. The flow regulating valve is formed to move parallel between positions at times when the flow rate is high and low so that a turning angle of a fluid passing through the introducing port is maintained constant at any of times when the flow rate is low, the flow rate is high, the flow rate shifts from a low rate to a high rate, and the flow rate shifts from the high rate to the low rate.

According to the variable capacity turbine of the third aspect of the present invention, the turning angle of the fluid passing through the introducing port is maintained constant at any of times when the flow rate is low, the flow rate is high, the flow rate shifts from the low rate to the high rate, and the flow rate shifts from the high rate to the low rate, which further suppresses separation from the outer peripheral face of the upstream tip end portion of the involute dividing wall, further enhances performance, and further increases the flow rate.

A turbocharger according to a fourth aspect of the present invention includes a variable capacity turbine with a reduced loss due to separation and satisfactory performance.

According to the turbocharger of the fourth aspect of the present invention, it is possible to enhance performance of the whole apparatus.

Advantageous Effects of Invention

With the variable capacity turbine according to the present invention, separation from the outer peripheral face of the involute dividing wall at the inlet portion of the outer scroll can be suppressed, performance can be enhanced, and the flow rate can be increased.

DESCRIPTION OF EMBODIMENTS

A first embodiment of a variable capacity turbine according to the present invention will be described below with reference to FIGS. 1 to 3.

Figure 1:
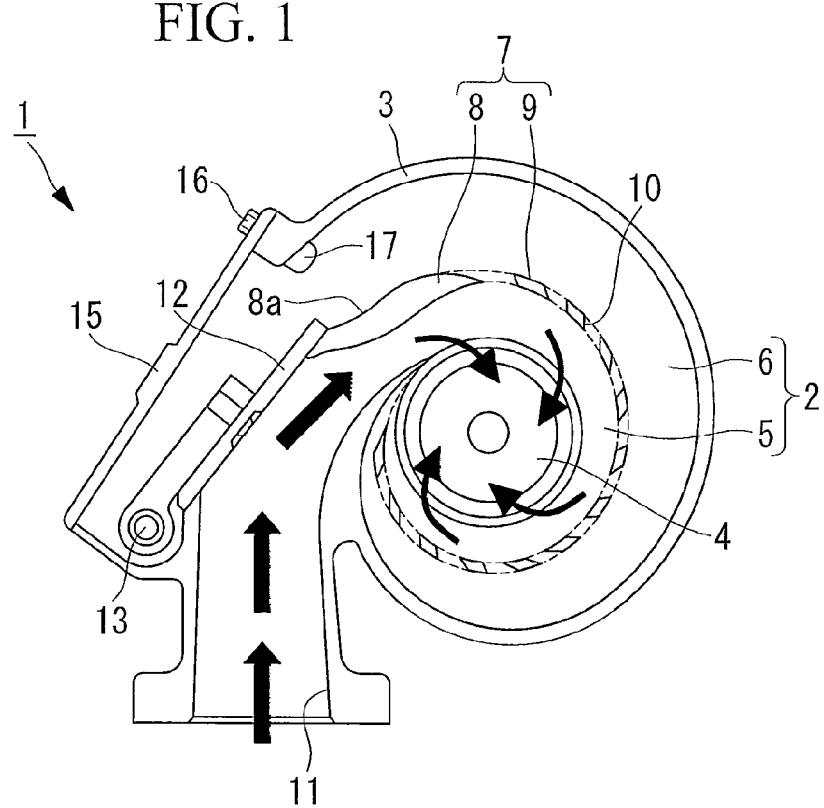
FIG. 1 is a sectional view perpendicular to an axis of a variable capacity turbine when a flow rate is low, according to a first embodiment of the present invention.
Figure 2:
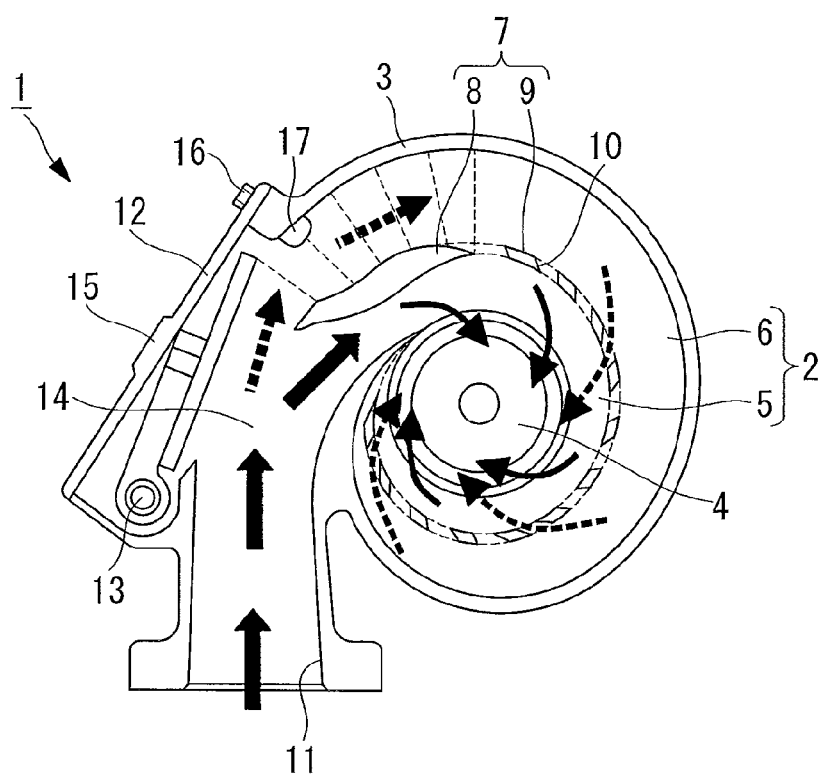
FIG. 2 is a sectional view perpendicular to the axis of the variable capacity turbine when the flow rate is high, according to the first embodiment of the present invention.
Figure 3:
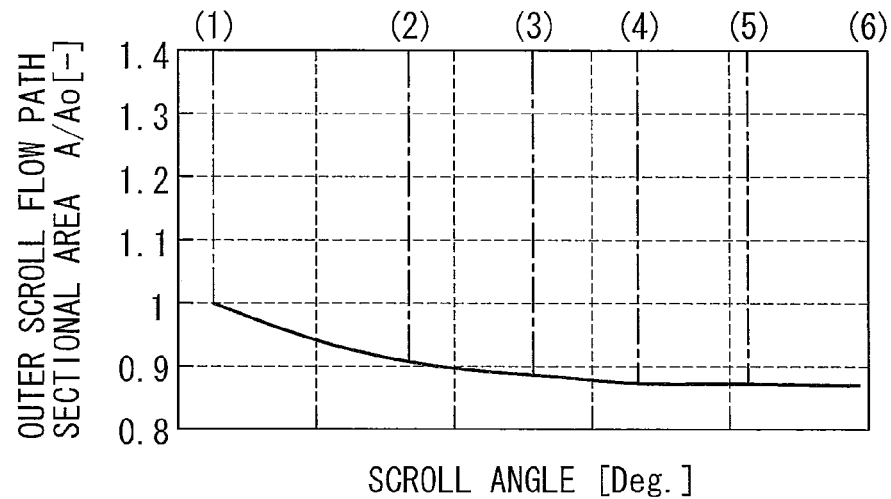
FIG. 3 is a diagram for explaining a characteristic portion of the variable capacity turbine according to the first embodiment of the present invention.

FIG. 1 is a sectional view perpendicular to an axis of the variable capacity turbine when a flow rate is low according to the present embodiment, FIG. 2 is a sectional view perpendicular to the axis of the variable capacity turbine when a flow rate is high according to the present embodiment, and FIG. 3 is a diagram for explaining a characteristic portion of the variable capacity turbine according to the present embodiment.

As shown in FIGS. 1 and 2, the variable capacity turbine 1 according to the present embodiment is mainly formed of a turbine housing 3 in which an involuted scroll 2 is formed, and a turbine wheel 4 rotatably provided on an inner periphery side of the scroll 2.

The scroll 2 includes an inner scroll 5 formed inside in a radial direction (on the inner periphery side) and an outer scroll 6 formed outside in the radial direction (on an outer periphery side), i.e., formed to surround a radial outside of the inner scroll 5. The inner scroll 5 and the outer scroll 6 are divided (separated) by an involute dividing wall 7 and the involute dividing wall 7 is formed (mounted) in the turbine housing 3 so that the outer scroll 6 has a larger capacity than the inner scroll 5. The involute dividing wall 7 is formed of a tongue-shaped first dividing wall 8 and a plate-shaped second dividing wall 9. In the second dividing wall 9, there is formed a plurality of communication holes 10 which introduces from the outer scroll 6 to the inner scroll 5 exhaust gas (fluid) introduced into the outer scroll 6 when the flow rate is high.

The turbine housing 3 is adjacent to a compressor housing (not shown) and mounted on a bearing housing (not shown) which is mounted on the compressor housing, and has an exhaust gas introducing port 11 and an exhaust gas discharge port (not shown). On an upstream side (on the exhaust gas introducing port 11 side) of the first dividing wall 8, the turbine housing 3 is provided with a flow control valve 12. The flow control valve 12 is mainly formed of a plate-shaped member formed so that a flat face formed on an inner periphery side of a downstream tip end portion comes in contact with (overlaps) a flat face (flat slope) formed on an outer periphery side of an upstream tip end portion of the first dividing wall 8. The flow control valve 12 is turned by turning means (not shown) about a turning shaft 13 positioned on the exhaust gas introducing port 11 side and provided (mounted) onto the turbine housing 3 to switch between a position for closing (fully closing) an introducing port 14 (see FIG. 2) of the outer scroll 6 shown in FIG. 1 and a position for opening (fully opening) the introducing port 14 of the outer scroll 6 shown in FIG. 2. In FIGS. 1 and 2, a reference numeral 15 designates a cover closing an opening portion of the turbine housing 3, a reference numeral 16 designates a bolt for fixing the cover 15 to the turbine housing 3, and a reference numeral 17 designates a built-up portion covering a tip end portion of the bolt 16.

The outer scroll 6 of the variable capacity turbine 1 according to the present embodiment is formed so as to have a continuous throttle flow path from an upstream side to a downstream side at the inlet portion, i.e., so that a flow path sectional area at the inlet portion follows a track shown in a solid line in FIG. 3, for example. In other words, the outer scroll 6 of the variable capacity turbine 1 according to the present embodiment is formed so that a sectional area (see (1) in FIG. 3) of a flow path surrounded with the tip end on the downstream inner periphery side of the flow control valve 12, an outer peripheral face of the first dividing wall 8, and an inner peripheral face of the turbine housing 3 is larger than a sectional area (see (2) in FIG. 3) of a flow path surrounded with an inner peripheral face of the built-up portion 17, the outer peripheral face of the first dividing wall 8, and the inner peripheral face of the turbine housing 3, that the sectional area (see (2) in FIG. 3) of the flow path surrounded with the inner peripheral face of the built-up portion 17, the outer peripheral face of the first dividing wall 8, and the inner peripheral face of the turbine housing 3 is larger than a sectional area (see (3) to (6) in FIG. 3) of a flow path surrounded with the outer peripheral face of the first dividing wall 8 and the inner peripheral face of the turbine housing 3, and that the sectional area of the flow path surrounded with the outer peripheral face of the first dividing wall 8 and the inner peripheral face of the turbine housing 3 gradually (gently) reduces from the upstream side to the downstream side (see (3) to (6) in FIG. 3).

(1) to (6) in FIG. 3 respectively correspond to six broken lines (broken lines drawn in directions orthogonal to a central axis of the outer scroll 6) shown in FIG. 2, (1) in FIG. 3 corresponds to the broken line positioned most upstream in FIG. 2, and (6) in FIG. 3 corresponds to the broken line positioned most downstream in FIG. 2.

$A_0$ in FIG. 3 indicates a sectional area of a flow path along the broken line positioned most upstream in FIG. 2 and A in FIG. 3 indicates a sectional area of a flow path along each of the broken lines in FIG. 2.

In the variable capacity turbine 1 according to the present embodiment, a flow path at the inlet portion of the outer scroll 6 is formed as the continuous throttle flow path from the upstream side to the downstream side. In other words, the inner peripheral face of the outer scroll 6 at the inlet portion of the outer scroll 6 and/or the outer peripheral face of the first dividing wall 8 are/is formed so that the flow path sectional area gradually reduces, which facilitates acceleration of the exhaust gas at the inlet portion of the outer scroll 6, suppresses separation from the outer peripheral face of the upstream tip end portion of the first dividing wall 8, enhances performance, and increases the flow rate.

Figure 4:
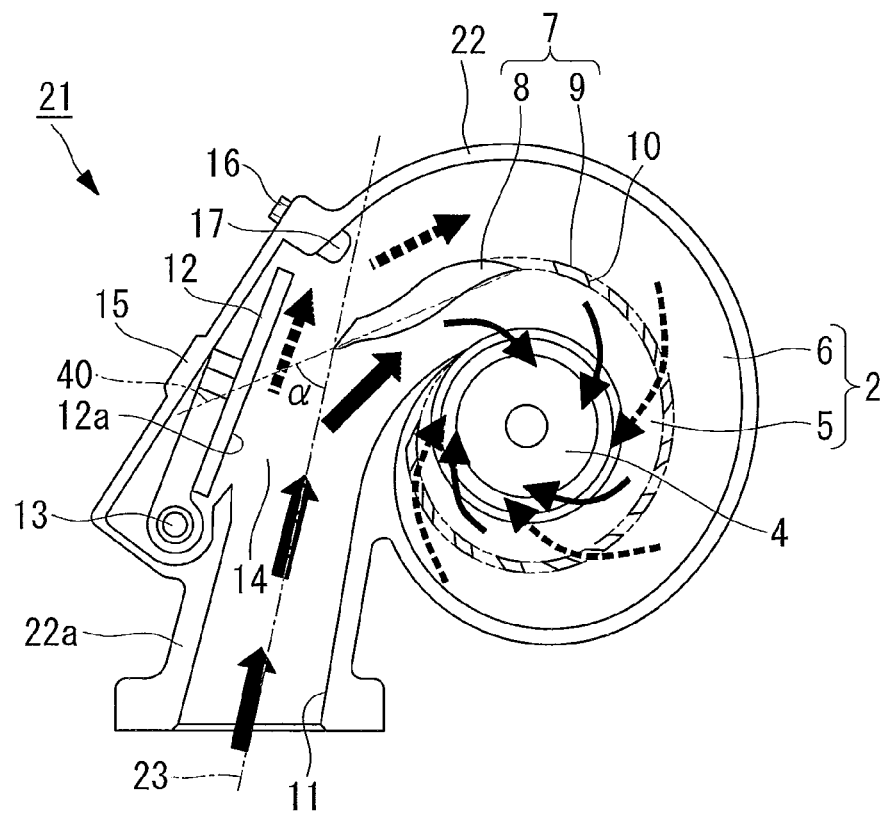
FIG. 4 is a sectional view perpendicular to an axis of a variable capacity turbine when a flow rate is high, according to a second embodiment of the present invention.

A variable capacity turbine according to a second embodiment of the present invention will be described with reference to FIG. 4. FIG. 4 is a sectional view perpendicular to an axis of the variable capacity turbine when a flow rate is high, according to the present embodiment.

The variable capacity turbine 21 according to the present embodiment is different from the turbine of the first embodiment in that the turbine 21 has a turbine housing 22 instead of the turbine housing 3. Because the other components are similar to those of the first embodiment described above, description thereof will not be repeated.

As shown in FIG. 4, the turbine housing 22 according to the present embodiment is formed so that an angle α formed by a line 40 connecting the upstream tip end and a downstream tip end of the first dividing wall 8 and a central axis 23 of an inlet flange 22a forming an inlet portion of the turbine housing 22 is in a range of 35° to 50° when the flow rate is high (i.e., when the flow control valve 12 is in the position for opening (fully opening) the introducing port 14 of the outer scroll 6). In other words, the turbine housing 22 according to the present embodiment is formed so that a flat face 12a positioned on an inner periphery side of the flow control valve 12 and the central axis 23 of the inlet flange 22a becomes substantially parallel with each other when the flow control valve 12 is fully open.

Inside the inlet flange 22a, the exhaust gas introducing port 11 is formed.

In the variable capacity turbine 21 according to the present embodiment, a flow path at the inlet portion of the outer scroll 6 is formed as the continuous throttle flow path from the upstream side to the downstream side. In other words, the inner peripheral face of the outer scroll 6 at the inlet portion of the outer scroll 6 and/or the outer peripheral face of the first dividing wall 8 are/is formed so that the flow path sectional area gradually reduces, which facilitates acceleration of the exhaust gas at the inlet portion of the outer scroll 6, suppresses separation from the outer peripheral face of the upstream tip end portion of the first dividing wall 8, enhances performance, and increases the flow rate.

Moreover, the inlet flange 22a is disposed so that the angle α formed by the line 40 connecting the upstream tip end and the downstream tip end of the first dividing wall 8 and the central axis 23 of the inlet flange 22a forming the inlet portion of the turbine housing 22 is smaller than that of the first embodiment described above and a turning angle of the exhaust gas passing through the introducing port 14 is smaller than that of the first embodiment described above, which further suppresses separation from the outer peripheral face of the upstream tip end portion of the first dividing wall 8, further enhances performance, and further increases the flow rate.

Figure 5:
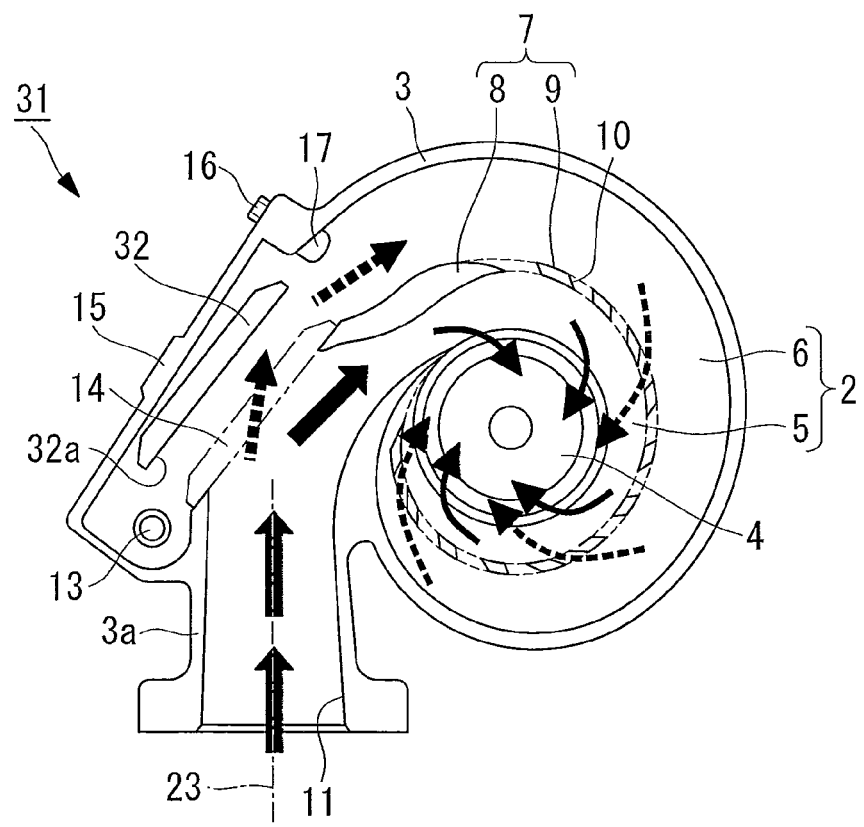
FIG. 5 is a sectional view perpendicular to an axis of a variable capacity turbine according to a third embodiment of the present invention.

A variable capacity turbine according to a third embodiment of the present invention will be described with reference to FIG. 5. FIG. 5 is a sectional view perpendicular to an axis of the variable capacity turbine according to the present embodiment.

A variable capacity turbine 31 according to the present embodiment is different from the turbine of the first embodiment described above in that the turbine 31 has a flow control valve 32 instead of the flow control valve 12. Because other components are similar to those of the first embodiment described above, description thereof will not be repeated.

As shown in FIG. 5, the flow control valve 32 according to the present embodiment is formed to move parallel between a high flow rate position shown in a solid line in FIG. 5 (i.e., when the flow control valve 32 is in a position for opening (fully opening) the introducing port 14 of the outer scroll 6) and a low flow rate position shown in a two-dot chain line in FIG. 5 (i.e., when the flow control valve 32 is in a position for closing (fully closing) the introducing port 14 of the outer scroll 6). In other words, the flow control valve 32 according to the present embodiment is formed to be opened and closed with a flat face 32a positioned on an inner periphery side of the flow control valve 32 and the central axis 23 of an inlet flange 3a forming the inlet portion of the turbine housing 3 maintained at a certain angle with respect to each other.

Inside the inlet flange 3a, the exhaust gas introducing port 11 is formed.

In the variable capacity turbine 31 according to the present embodiment, a flow path at the inlet portion of the outer scroll 6 is formed as the continuous throttle flow path from the upstream side to the downstream side. In other words, the inner peripheral face of the outer scroll 6 at the inlet portion of the outer scroll 6 and/or the outer peripheral face of the first dividing wall 8 are/is formed so that the flow path sectional area gradually reduces, which facilitates acceleration of the exhaust gas at the inlet portion of the outer scroll 6, suppresses separation from the outer peripheral face of the upstream tip end portion of the first dividing wall 8, enhances performance, and increases the flow rate.

Moreover, a turning angle of the exhaust gas passing through the introducing port 14 is constantly maintained at any of times when the flow rate is low, when the flow rate is high, when the flow rate shifts from the low rate to the high rate, and when the flow rate shifts from the high rate to the low rate, which further suppresses separation from the outer peripheral face of the upstream tip end portion of the first dividing wall 8, further enhances performance, and further increases the flow rate.

The present invention is not limited to the embodiments described above but may be carried out while being modified or changed suitably as necessary without departing from the scope of the technical idea of the present invention.

For example, in the second embodiment shown in FIG. 4, it is possible to employ the flow control valve 32 according to the third embodiment shown in FIG. 5 instead of the flow control valve 12.

Moreover, although the turbine, in which a gently curved recessed portion 8a (see FIG. 1) is formed in the outer peripheral face of the first dividing wall 8 in order to mitigate abrupt reduction in the flow path sectional area due to the built-up portion 17, has been described as a concrete example in the embodiments described above, the inner peripheral face of the turbine housing 3 may be recessed instead of recessing the outer peripheral face of the first dividing wall 8, so that the flow path at the inlet portion of the outer scroll 6 becomes a continuous and gentle throttle flow path from the upstream side to the downstream side.

REFERENCE SIGNS LIST

1 variable capacity turbine
2 scroll
3 turbine housing
4 turbine wheel
5 inner scroll
6 outer scroll
7 involute dividing wall
12 flow control valve
12*a* flat face
14 introducing port
21 variable capacity turbine
22 turbine housing
22*a* inlet flange
23 central axis
31 variable capacity turbine
32 flow control valve

The invention claimed is:

1. A variable capacity turbine comprising:
a turbine housing having an involuted scroll formed therein;
a turbine wheel rotatably provided on an inner periphery side of the scroll;
an involute dividing wall mounted on the turbine housing to divide the scroll into an inner scroll and an outer scroll; and
a flow regulating valve for opening and closing an introducing port formed at an inlet end of the outer scroll, wherein
an inner peripheral face of the outer scroll at an inlet portion of the outer scroll or an outer peripheral face of the involute dividing wall is formed so that a flow path sectional area gradually reduces,
an inner peripheral surface of the flow control valve is a flat face and the flow control valve is formed so that the flat face and a central axis of an inlet flange forming an inlet portion of the turbine housing become substantially parallel with each other when the valve is fully open,
the involute dividing wall is formed of a tongue-shaped first dividing wall and a plate-shaped second dividing wall, and
an angle formed by a line connecting an upstream tip end and a downstream tip end of the first dividing wall and the central axis is smaller than an angle formed by the line and a vertical line.

2. A turbocharger comprising the variable capacity turbine according to claim 1.

* * * * *